(12) United States Patent
Malik et al.

(10) Patent No.: US 11,003,492 B2
(45) Date of Patent: *May 11, 2021

(54) VIRTUAL MACHINE CONSOLIDATION

(71) Applicant: INTERNATIONAL BUSINESS MACHINES CORPORATION, Armonk, NY (US)

(72) Inventors: Pooja Malik, New Delhi (IN); Vikram Yadav, Ghazaibad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,240

(22) Filed: May 28, 2019

(65) Prior Publication Data

US 2019/0340007 A1    Nov. 7, 2019

Related U.S. Application Data

(63) Continuation of application No. 15/468,683, filed on Mar. 24, 2017, now Pat. No. 10,379,898.

(51) Int. Cl.
*G06F 9/455* (2018.01)
*G06F 9/48* (2006.01)
*G06F 9/50* (2006.01)

(52) U.S. Cl.
CPC ........ *G06F 9/4856* (2013.01); *G06F 9/45558* (2013.01); *G06F 9/5077* (2013.01); *G06F 2009/45595* (2013.01); *Y02D 10/00* (2018.01)

(58) Field of Classification Search
CPC ....... G06F 2009/45595; G06F 9/45558; H04L 43/16; H04L 45/38; G05B 2219/34477
See application file for complete search history.

(56) References Cited

U.S. PATENT DOCUMENTS

| | | |
|---|---|---|
| 8,904,242 B2 | 12/2014 | Machida |
| 9,086,902 B2 | 7/2015 | Konik et al. |
| 9,372,735 B2 | 6/2016 | Calder et al. |
| 2015/0156124 A1* | 6/2015 | Tsuji ................... H04L 47/6275 370/230 |

(Continued)

OTHER PUBLICATIONS

Pooja Malik; Method and Framework for Virtual Machine Consolidation without affecting QoS in Cloud; 2016 (Year: 2016).*

(Continued)

*Primary Examiner* — Dong U Kim
(74) *Attorney, Agent, or Firm* — Schmeiser, Olsen & Watts, LLP; Nicholas L. Cadmus

(57) ABSTRACT

A method and system for reassigning failed jobs. It is determined that a job queue of a virtual network is overloaded. Each job is set in the job queue to be processed in a scalable mode of operation as a function of the job queue being overloaded. A job is apportioned in the job queue to a virtual machine in the virtual network operating in the scalable mode of operation. The job queued by the virtual machine fails to be completed. A probability of failing to complete the job by the virtual machine is computed. It is determined, as a function of the probability of failing to complete the job, whether to complete the job queued by the virtual machine or transfer the job to a queue of a second virtual machine operating in a dynamic voltage and frequency scaling (DVFS) mode or an active mode.

20 Claims, 6 Drawing Sheets

(56) References Cited

U.S. PATENT DOCUMENTS

2016/0371585 A1* 12/2016 McElhinney ...... G05B 23/0254
2017/0054658 A1* 2/2017 Min ......................... G06F 9/54
2017/0177396 A1* 6/2017 Palermo ................. H04L 49/70
2018/0276038 A1 9/2018 Malik et al.

OTHER PUBLICATIONS

Dhiman, Gaurav et al.; Dynamic Voltage Frequecy [sic] Scaling for Multi-tasking Systems Using Online Learning; 2007 ACM/IEEE International Symposium on Low Power Electronics and Design; Aug. 27-29, 2007; pp. 207-212.

Hay, Richard; Machine Learning Based DVFS for Energy Efficient Execution of Multithreaded Workloads; Thesis submitted to Graduate Council of Texas State University in partial fulfillment of the requirement for the degree of Master of Science with a Major in Computer Science; Dec. 2014; 50 pages.

Masoumzadeh, Seyed Saeid et al.; Integrating VM Selection Criteria in Distributed Dynamic VM Consolidation Using Fuzzy Q-Learning; 2013 9th International Conference on Network and Service Management; Oct. 14-18, 2013; pp. 332-338.

Office Action (dated Dec. 10, 2018) for U.S. Appl. No. 15/468,683, filed Mar. 24, 2017.

Amendment (dated Mar. 11, 2019) for U.S. Appl. No. 15/468,683, filed Mar. 24, 2017.

Notice of Allowance (dated Apr. 1, 2019) for U.S. Appl. No. 15/468,683, filed Mar. 24, 2017.

* cited by examiner

VIRTUAL MACHINE CONSOLIDATION

This application is a continuation application claiming priority to Ser. No. 15/468,683, filed Mar. 24, 2017, now U.S. Pat. No. 10,379,898, issued Aug. 13, 2019.

TECHNICAL FIELD

The present disclosure relates generally to systems, methods and tools for allocating resources between virtual machines in a computer network.

BACKGROUND

Server virtualization involves simulating one or more virtual machines (VMs), each running a separate operating system (OS) instance on a single physical server. Each OS may run in a different VM. A virtual machine monitor (VMM), also known as a hypervisor, may manage the VMs that execute on a host system to provide the functionality of several guest operating systems on top of the host, on the same computer hardware (physical machine), at the same time. Server virtualization technologies are becoming increasingly commonplace in data centers. Server virtualization technologies enable applications to be packaged inside virtual machines and allow multiple VMs to run on a single physical machine without interfering with each other. This provides increased utilization of resources and consolidation of server, space and data center costs.

Modern server virtualization technologies are transforming enterprise data centers including information technology (IT) hardware and software systems. By consolidating multiple physical bare-metal servers into virtualized machines, enterprises are improving resource utilizations and reducing operational costs. Virtualization technologies provide administrators with the ability to manually set virtualization parameters. The virtualization parameters include a minimum amount of a resource required for a VM, a maximum allowable resource and its share of spare resource.

SUMMARY

A first embodiment of the present disclosure provides a method for reassigning failed jobs in a virtual network of virtual machines comprising the steps of: calculating, by a processor, whether a job queue of the virtual network is overloaded as a function of a length of an extended job queue being greater than a length of the job queue; setting, by the processor, each job in the job queue to be processed in a scalable mode of operation as a function of the job queue being overloaded; defining, by the processor, a number of virtual machines in each scalable mode of operation; apportioning, by the processor, a job in the job queue to a virtual machine in the virtual network operating in the scalable mode of operation; failing, by the processor, to complete the job queued by the virtual machine; recovering, by the processor, from failing to complete the job queued by the virtual machine and calculating a probability of failing to complete the job by the virtual machine as a function of the amount of time to execute the job to completion, a repair time, a failure rate and an amount of time remaining to complete the job within a time designated by a service level agreement; and determining, by the processor, as a function of the probability of failing to complete the job, whether to complete the job queued by the virtual machine or transfer the job to a queue of a second virtual machine operating in a dynamic voltage and frequency scaling (DVFS) mode or an active mode.

A second embodiment of the present disclosure provides a computer system comprising a processor; a memory device coupled to the processor; and a computer readable storage device coupled to the processor, wherein the storage device contains program code executable by the processor via the memory device to implement a method for reassigning failed jobs in a virtual network of virtual machines comprising the steps of: calculating, by the processor, whether a job queue of the virtual network is overloaded as a function of a length of an extended job queue being greater than a length of the job queue; setting, by the processor, each job in the job queue to be processed in a scalable mode of operation as a function of the job queue being overloaded; defining, by the processor, a number of virtual machines in each scalable mode of operation; apportioning, by the processor, a job in the job queue to a virtual machine in the virtual network operating in the scalable mode of operation; failing, by the processor, to complete the job queued by the virtual machine; recovering, by the processor, from failing to complete the job queued by the virtual machine and calculating a probability of failing to complete the job by the virtual machine as a function of the amount of time to execute the job to completion, a repair time, a failure rate and an amount of time remaining to complete the job within a time designated by a service level agreement; and determining, by the processor, as a function of the probability of failing to complete the job, whether to complete the job queued by the virtual machine or transfer the job to a queue of a second virtual machine operating in a dynamic voltage and frequency scaling (DVFS) mode or an active mode.

A third embodiment of the present disclosure provides a computer program product comprising: one or more computer readable hardware storage devices having computer readable program code stored therein, said program code containing instructions executable by one or more processors to implement a method for reassigning failed jobs in a virtual network of virtual machines comprising the steps of: calculating, by the processor, whether a job queue of the virtual network is overloaded as a function of a length of an extended job queue being greater than a length of the job queue; setting, by the processor, each job in the job queue to be processed in a scalable mode of operation as a function of the job queue being overloaded; defining, by the processor, a number of virtual machines in each scalable mode of operation; apportioning, by the processor, a job in the job queue to a virtual machine in the virtual network operating in the scalable mode of operation; failing, by the processor, to complete the job queued by the virtual machine; recovering, by the processor, from failing to complete the job queued by the virtual machine and calculating a probability of failing to complete the job by the virtual machine as a function of the amount of time to execute the job to completion, a repair time, a failure rate and an amount of time remaining to complete the job within a time designated by a service level agreement; and determining, by the processor, as a function of the probability of failing to complete the job, whether to complete the job queued by the virtual machine or transfer the job to a queue of a second virtual machine operating in a dynamic voltage and frequency scaling (DVFS) mode or an active mode.

DETAILED DESCRIPTION

Figure 1:
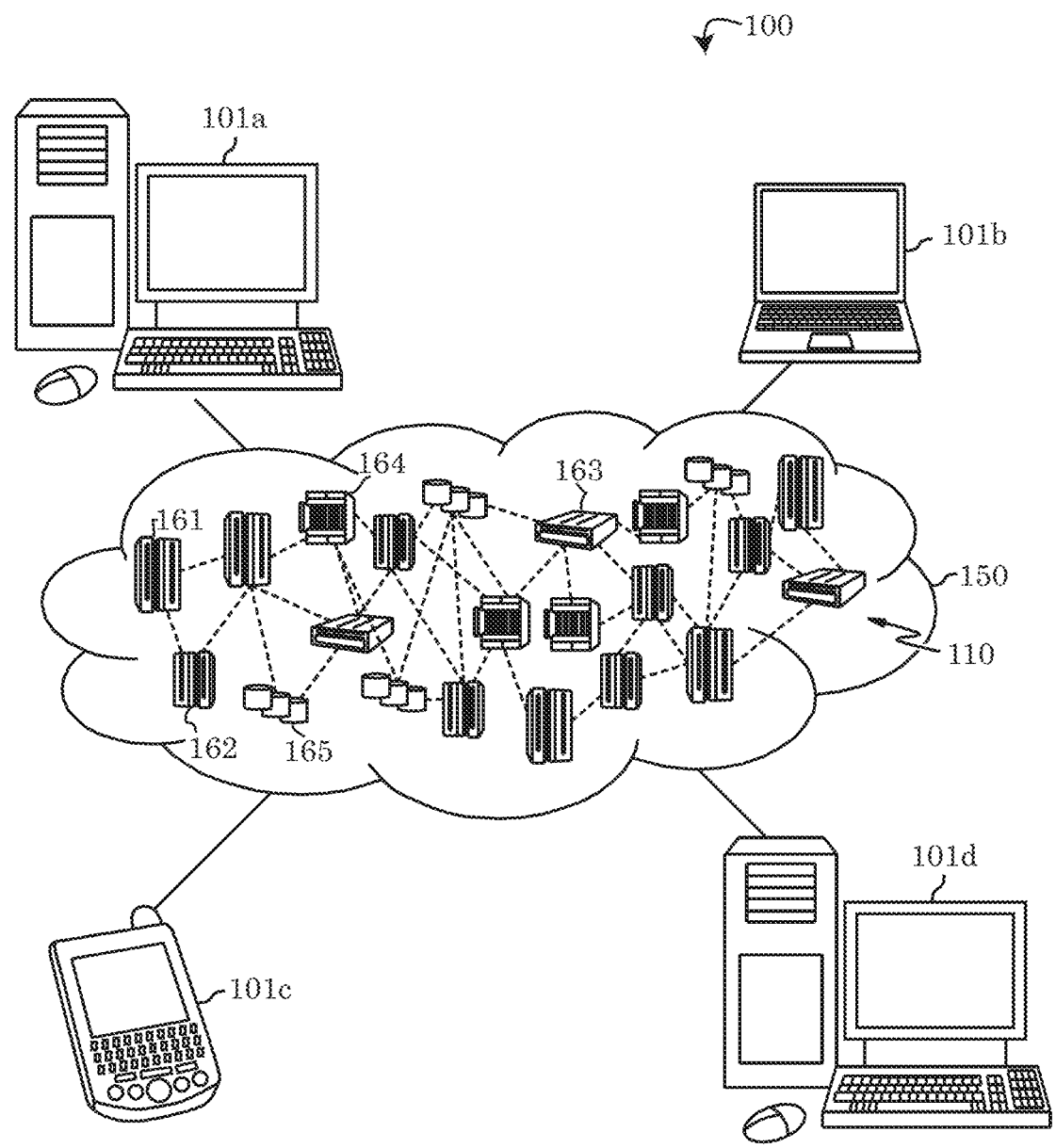
FIG. 1 illustrates a cloud computing environment consistent with the embodiments of the present disclosure.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

In today's information age, data centers and computing networks serve large quantities of customers. Completion of each customer's job on time and within the specifications of the service level agreements (SLA) can be a delicate balance, but critical for success. Typically, data centers and server farms contain thousands of servers which require large amounts of power for operating and cooling which can lead to high operating costs and hidden costs associated with the carbon footprint of the data center. Strategies for managing the consumption energy within the data center often rely on the reduction of power consumption to the network. Reduction of power consumption raises several concerns regarding the violation of the SLA. Shutting down or placing servers in a low power state can sacrifice quality of service and if the quality of service falls below the requirements of the SLA, penalties may be incurred. Some data centers may employ physical switching to avoid the loss in the quality of service. However, implementing switching may cause a need for extra power consumption and may require additional physical mechanisms such as additional printed circuit boards (PCBs)

Embodiments of the present disclosure implements systems and methods for managing the job queues of virtual machines (VMs) while maintaining the lowest energy consumption for providing a quality of service within the specifications of the SLA. The embodiments of the present disclosure are able to migrate jobs or place jobs into a new VM queue when a VM of the virtual network has failed. The systems and methods may employ machine learning techniques to make decisions regarding whether or not to reallocate the job to a VM running in an active mode (non-scalable mode) or a VM operating under a dynamic voltage and frequency scaling (DVFS) mode.

The systems, methods and tools of the present disclosure may optimize the data center's completion of jobs by serving the job from one VM experiencing a failure to a new VM capable of completing the job on time and within the specifications of the SLA. The embodiments of the disclosure may use machine learning techniques to learn from past VM failures when making determinations how to apportion the jobs to a new VM queue or conduct VM repairs. The VM failures may be due to software failures, hardware failures or catastrophic failures. On the basis of the failure, the systems and tools may analyze numerous factors when making the decision to complete the job by one of the VMs in the network.

For example, the systems and tools may account for the type of failure, repair time, criticality of the queued job, probability of successfully repairing the failed VM, transition time needed to migrate the job from the failed VM to the new VM based on prior failure experiences, and the time needed to execute the queued job. The systems and tools may conclude, based on the numerous factors taken into account under the machine learning techniques, whether to transfer the job from the failed VM to a second VM, the operating mode of the second VM that will have the best probability of completing the job, or the systems and tools may determine that the failed VM may be recovered and repaired with enough time to complete the job using the original VM that had previously failed.

Embodiments of the present disclosure employing the machine learning techniques to reconcile job failures may be able to transfer and/or complete jobs using the network of VMs without degrading the quality of service and maintaining a lower power consumption policy through the implementation of various scalable modes, including idle, busy, sleep, DVFS gradient and DVFS maximum modes. Embodiments of the implemented framework for completing jobs in the job queue improve the overall reliability of the data center by switching the jobs to scalable nodes, increasing the recoverability of the systems in the virtualized environments, meeting SLA requirements while maintaining lower energy consumption.

System for Reassigning Failed Jobs in a Virtual Network

Figure 2:
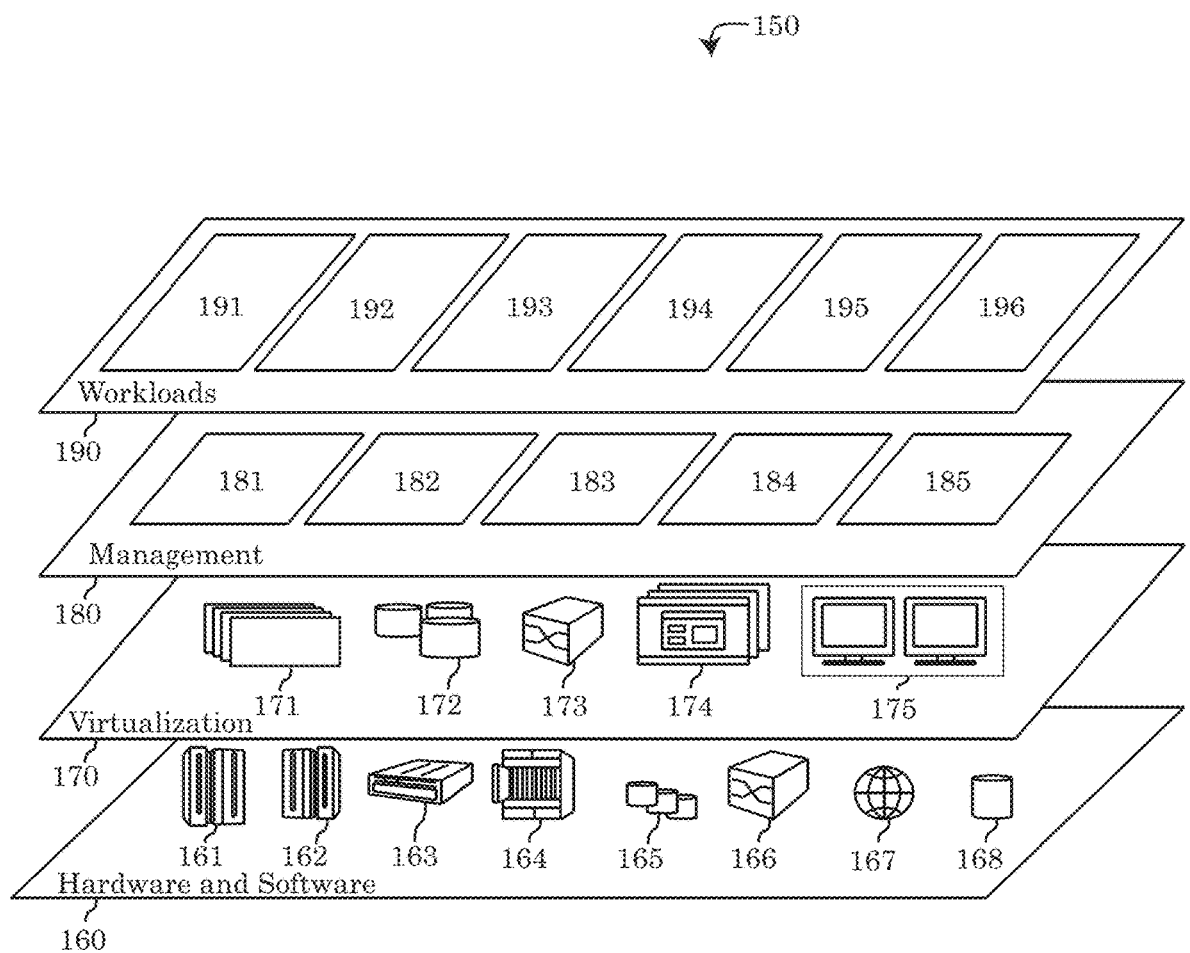
FIG. 2 depicts abstraction model layers of a cloud computing environment consistent with the embodiments of the present disclosure.
Figure 3:
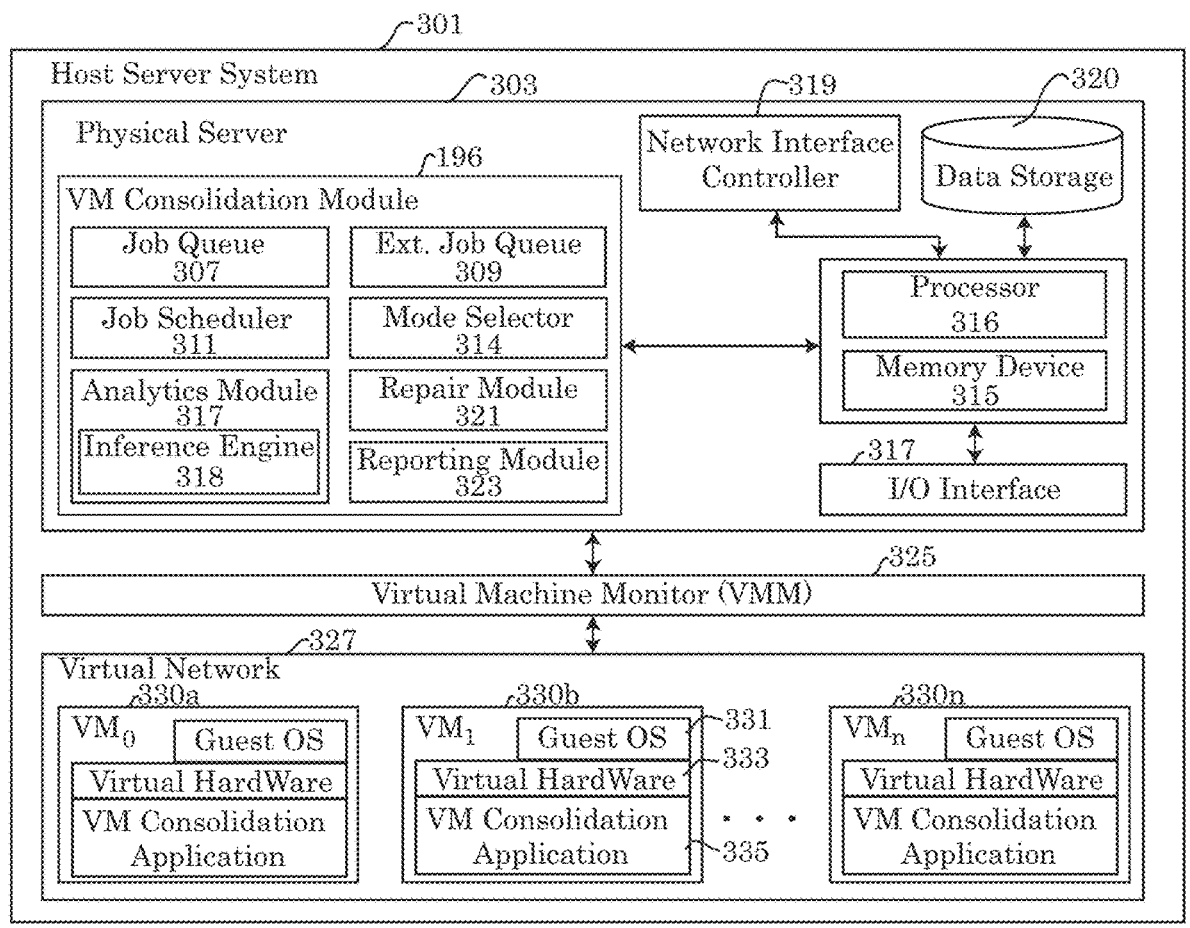
FIG. 3 depicts a block diagram of an embodiment of a system for reassigning failed jobs in a virtual network of virtual machines.

Referring to the drawings, FIGS. 1-3 illustrate a diagram of an embodiment of a system 100, 301 for reassigning failed jobs in a virtual network 327 of virtual machines, consistent with the disclosures of this application. Embodiments of systems 100, 301 may comprise specialized computer systems 101*a*, 101*b*, 101*c*, 101*d* (collectively referred to as "client devices 101"), 110, 301 which may include the hardware 160 shown in FIG. 2, for example mainframes, 161, RISC architecture based servers 162, servers 163, blade servers 164, storage devices 165 and networking components 166. The specialized computer systems 101, 110, 301 may have a specialized configuration of hardware, software or a combination thereof as depicted in FIGS. 1-3 as network application server software 167, database software 168, VM consolidation module 196 and as described throughout the present disclosure. Embodiments of the computer systems 101, 110, 301 may further comprise one or more elements of the generic computer system 500 of FIG. 5, described in detail below. The elements of the generic computer system 500 may be integrated into each of the specialized computer systems 101, 110, 301 described herein.

Embodiments of the computer systems 101, 110, 301 may be specialized computer systems which may include a processor 316, 591, specialized hardware or circuitry and/or software loaded in the memory device 315, 594, 595 of the computer system 101, 110, 301. The embodiments of the computer system 101, 110, 301 may perform functions, tasks and routines relating to the transmission and receipt of jobs, placing each of the jobs into a job queue or extended job queue, scheduling jobs for completion, transferring or repairing by one or more VMs, selecting scalable or non-scalable operating modes for the completion of the scheduled jobs, analyzing jobs schedules and job failures using machine learning techniques to draw conclusions about the job allocations that provide each VM the highest probability of completing the job within the specification of the SLA, repairing VMs experiencing job failures and reporting job success or failures to one or more computer systems 101, 110, 301 of the network 150 or virtual network 327.

Embodiments of the specialized hardware and/or software integrated into the computer systems 101, 110, 301 may be part of a VM consolidation module 196 performing each of the functions of the computer system 101, 110, 301 relating to the assignment, reallocation and completion of the jobs assigned to the computer systems of the network 150. The hardware and/or software components of the VM consolidation module 196 may include one or more sub modules performing each task of the computer system 101, 110, 301. These sub modules may include job queue module 307, extended job queue module 309, job scheduler module 311, mode selector module 314, analytics module 317 which may comprise an inference engine 318, repair module 321 and a reporting module 323. As used herein, the term "module" may refer to a hardware module, software-based module or a module may be a combination of hardware and software resources of the computer system 101, 110, 301 and/or resources remotely accessible to the computer system 101, 110, 301 via a computer network 150.

Embodiments of computer system 101, may, in some embodiments be connected and placed in communication with one or more additional computer systems over a computer network 150, including one or more computing nodes 110 and client devices 101. Embodiments of the network 150 may be constructed using wired or wireless connections between each hardware component connected to the network 150. As shown in the embodiment of a cloud computing network 100 of FIG. 1, each of the computer systems 101, 110 may connect to the network 150 and communicate over the network 150 using a network interface controller (NIC) 319 or other network communication device. Embodiments of the NIC 319 may implement specialized electronic circuitry allowing for communication using a specific physical layer and a data link layer standard, such as Ethernet, Fiber channel, Wi-Fi or Token Ring. The NIC 319 may further allow for a full network protocol stack, enabling communication over network 150 to the group of computer systems 101, 110 or other computing hardware devices linked together through communication channels. The network 150 may facilitate communication and resource sharing among the computer systems 101, 110 and additional hardware devices connected to the network 150. Examples of network 150 may include cloud computing networks 100, a local area network (LAN), home area network (HAN), wide area network (WAN), back bone networks (BBN), peer to peer networks (P2P), campus networks, enterprise networks, the Internet, and any other network known by a person skilled in the art.

It should be understood that although this disclosure includes a detailed description of a cloud computing network 150, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics of the cloud computing model may be described as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models under a cloud computing environment may be described as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models of cloud computing environments may be described as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment may be service oriented with a focus on statelessness, low coupling, modularity, and semantic interoperability. At the heart of cloud computing is an infrastructure that includes a network of interconnected nodes.

Referring to the drawings, FIG. 1 is illustrative of a cloud computing environment 150. As shown, the cloud computing environment 150 may include one or more cloud computing nodes 110 with which client computing devices 101 used by cloud consumers, such as, for example, desktop computers 101a, 101d, laptop computers 101b, and personal digital assistant (PDA) or cellular telephone 101c may communicate. Nodes 110 may communicate with one another. They may be grouped (not shown) physically or virtually, in one or more networks, such as Private, Community, Public, or Hybrid clouds as described hereinabove, or a combination thereof, allowing for the cloud computing environment 150 to offer infrastructure, platforms and/or software as services for which a cloud consumer does not need to maintain resources on a local computing device 101. It is understood that the types of computing devices 101 shown in FIG. 1 are intended to be illustrative only and that computing nodes 110 and cloud computing environment 150 can communicate with any type of computerized device over any type of network and/or network addressable connection (e.g., using a web browser).

Referring now to FIG. 2, a set of functional abstraction layers provided by cloud computing environment 150 is shown. It should be understood in advance that the components, layers, and functions shown in FIG. 2 are intended to be illustrative only and embodiments of the invention are not limited thereto. As depicted, the following layers and corresponding functions are provided:

Hardware and software layer 160 includes hardware and software components. Examples of hardware components include: mainframes 161; RISC (Reduced Instruction Set Computer) architecture based servers 162; servers 163; blade servers 164; storage devices 165; and networking components 166. In some embodiments, software components may include network application server software 167 and database software 168.

Virtualization layer 170 provides an abstraction layer from which the following examples of virtual entities may be provided: virtual servers 171; virtual storage 172; virtual networks 173, including virtual private networks; virtual applications and operating systems 174; and virtual clients 175.

In one example, management layer 180 may provide the functions described below. Resource provisioning 181 provides dynamic procurement of computing resources and other resources that are utilized to perform tasks within the cloud computing environment. Metering and Pricing 182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 183 provides access to the cloud computing environment for consumers and system administrators. Service level management 184 provides cloud computing resource allocation and management such that required service levels are met. Service Level Agreement (SLA) planning and fulfillment 185 provides pre-arrangement for, and procurement of, cloud computing resources for which a future requirement is anticipated in accordance with an SLA.

Workloads layer 190 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VM consolidation 196.

Referring to the drawings, FIG. 3 depicts an embodiment of a host server system 301. The host server 301 may be one of the computing nodes 110 integrated into the cloud computing network 150 shown in FIG. 1. For instance, the host server 301 may be a mainframe 161, RISC based server, server 162, blade server 163 or any other computing device of the cloud computing network 150. Embodiments of the host server 301 may include a physical server 303 comprising physical hardware and/or software components for running a virtual network 327 of one or more VMs 330a, 330b . . . 330n (referred to collectively as VMs 330). In order to create, run and manage each of the VMs 330 of the virtual network 327, embodiments of the host server 301 may comprise a virtual machine monitor (VMM) 325 (also referred to as a "hypervisor"). The VMM 325 may be computer software, firmware or hardware that is capable of creating and running VMs 330 and allocating resources of the physical server 303 to each of the VMs 330 created on the host server system 301. The VMM 325 may present the guest operating systems 331 (Guest OS 331) of the VMs with a virtual operating platform and manage the execution of the guest OS 331. In some embodiments, the VMM 325 may control the physical resources allotted to each VM by limiting the virtual hardware 333 representations of the physical server's 303 physical hardware components using the platforms created through the guest OS 331.

Each of the VMs 330 may be a software computer that may, similar to a physical computer, run an operating system (guest OS 331) and one or more applications. Embodiments of each VM 330 may be comprised of a set of specifications and configuration files which may be backed by the physical resources of the physical server 303 to complete one or more jobs queued by the VMs 303. In the exemplary embodiments, the VMs 330 may be loaded with a VM consolidation application 330 which may perform and execute each of the functions of the VM consolidation module 196 (described below), present as either hardware and/or software on the physical server 303 of the host server system 301.

Embodiments of the physical server 303 may comprise a processor 316, memory device 315, computer readable data storage device 320, network interface controller 319, input/output (I/O) interface 317 and VM consolidation module 196. Embodiments of the modules described in this application, whether comprising hardware, software or a combination of resources thereof, may be designed to implement or execute one or more particular functions, tasks or routines of the host server system 301, described herein, using the resources of the physical server 303. Embodiments of hardware-based modules may include self-contained components such as chipsets, specialized circuitry and one or more memory devices comprising a memory storage medium (described below). A software-based module may be part of a program code or linked to program code or computer code 597, 598 containing specific programmed instructions loaded into the memory device 315 of the computer system host server system 310, and/or a remotely accessible memory device of a network accessible computer system.

Embodiments of the VM consolidation module 196 may comprise a job queue module 307. The job queue module 307 may perform the task or function of receiving one or more jobs from each of the computer nodes 101 connecting to the cloud computing environment 150 that the host server system 301 may be a part of. The job queue module 307 may be a computing mechanism put in place by the host server system 301 to calculate a number of jobs being processed by the host server system 301 and the rate at which the jobs are being assigned to the host server system 301 of the cloud computing environment 150. As the jobs are received by the job queue module 307, the job queue module 307 may prioritize the jobs received and fill the respective job queues of one or more VMs 330 of the virtual network 327.

In some embodiments, of the VM consolidation module 196, the host server system 301 may further include an extended job queue module 309. The extended job queue module 309 may be responsible for receiving any overflow of jobs assigned to the host server system 301 that are beyond the amount of jobs that may be queued up into the job queue module 307. The host server system 301 may use the number of jobs sent to the extended job queue 309 as a benchmark for determining whether or not to process the jobs received by the host server system 301 using a non-scalable (active mode) VM or to switch to a scalable (DVFS) VM to process the incoming jobs. In the exemplary embodiments, the host server system 301 may compare the number of jobs in the extended job queue 309 to the number of jobs in the job queue 307. For example, if, upon comparison, the number of jobs in the extend job queue 309 (Q') minus the number of jobs in job queue 307 (Q) is greater than zero (i.e. Q'−Q>0), then the host server 301 may be determine that the jobs queue 307 is overloaded and may switch from processing jobs using VMs in a non-scalable mode to processing the jobs in a scalable mode.

Embodiments of the host server system 301 may set the VMs 330 operating in a scalable mode to one of a plurality of settings. Embodiments of a scalable mode VM may operate in a powernap to active mode, an inactive mode to powernap to active mode or an active mode to DVFS mode. The host server system 301 may attempt to minimize the amount of idling time for each of the VMs operating in a scalable mode to reduce the overall power consumption of the system 100 and the host server system 301.

In some embodiments of the host server system 301, the VM consolidation module 196 may further comprise a job scheduler 311. Embodiments of the job schedule may perform the task or function of assigning each of the jobs in the job queue module 307 and the extended job queue module 309 to each of the job queues of the VMs 330. Embodiments of the job scheduler may act as a single point of control for automating the distribution of jobs across the virtual network 327 to VMs ready to execute the jobs placed in queue. The Job scheduler 311 may additionally be responsible for performing the functions of transferring jobs from one VM to a second VM in the event of a job failure or inability of the selected VM to complete the assigned job on time within the specifications of the SLA.

In some embodiments of the host server system 301, the VM consolidation module 196 may include a mode selector module 314. The mode selector module 317 may be separate from or integrated into the job scheduler 311. Embodiments of the mode selector 314 may perform the function of selecting the operating mode of each VM 330 present in the virtual network 327. The mode selector 314 may set the VMs of the 330 to an active (non-scalable) or a DVFS (scalable) mode depending on the needs of the host server system 301, job queue status and the overall burden on the cloud computing environment 150. In some embodiments, the mode selector 314 may further indicate to VMs placed into a scalable mode, which scalable mode the VM should be operating in and optimize the amount of energy consumption utilized by the host server system 301. For example, the mode selector 314 may command a VM to enter a powernap mode, inactive mode, DVFS gradient mode or DVFS maximum mode depending optimal amount of energy needed to perform the queued jobs with minimal idling time.

The host system server 301 may operate in an efficient manner by minimizing the idling time for each of the VMs 330 operating in a scalable mode. The host system server 301 may take into account a number of parameters when calculating an optimal idle time and the parameters taken into account may vary amongst the different scalable modes. For example, in a powernap to active mode scaling solution, the host server system 301 may define the number of VMs 330 in powernap mode, the number of VMs in active mode, the amount of time it takes wakeup a VM 330 from powernap mode to transition into active mode and the amount of time needed to execute a selected job once placed into active mode. An equation for minimizing idle time in the powernap to active mode may be written as "idle time=SLA time−(execution time+total transition time from powernap to active mode)", wherein the total transition time includes the time needed to wake up the VM and complete the switch of the VM to active mode. This idle time equation may be written as $T_{idle}=T_{SLA}-(E_T+T_{PN-A})$.

Similarly, in the scalable mode defined as a transition from inactive to powernap to active mode, the host server system may take into account different sets of parameters to calculate the minimal idle time. For example, the host server system 301 may calculate the number of VMs 330 in powernap mode, the number of VMs 330 in active mode, the number of VMs 330 in inactive mode as well as the transition times for the VMs to change from inactive to powernap to active mode and powernap to active mode. Additionally, the calculation of idling may further take into account an amount of time that may be needed to wake up the VMs 330 from inactive to powernap mode, inactive to active mode or powernap to active mode. When a jobs is assigned to a VM that is transitioning directly from inactive to active mode, the idle time may be calculated as $T_{idle}=T_{SLA}-(E_T+T_{in-a})$, which may translate to the time allotted by the SLA minus the sum of the execution time plus the time to transition from inactive to active mode. Alternatively, in an embodiment wherein the job is assigned to a VM not moving directly from inactive to active mode, but rather inactive to powernap to active mode, the minimal idle time may be calculated as $T_{idle}=T_{SLA}-(E_T+T_{in-pn}+T_{PN-A})$.

In some embodiments, a VM 330 may be set to a DVFS mode which may scale the processing power of the VM 330 by a selected adjustment factor, which may be referred to as a gradient, $\mu$. This adjustment factor $\mu$ may be calculated as a gradient that may be required to scale the VM 330 which has been assigned a job wherein the service time for the job ($E_s$) may be greater than the time available (buffer time, $B_t$) to execute the job. The factor for calculating $\mu=Es/Bt$. Moreover, in embodiments operating in DVFS mode, the parameters of DVFS mode which may be used to determine the minimal idle time may include determining the number of VMs in DVFS mode, the time to transition from active mode to DVFS (written as $T_{a-dvfsgrad}$) and the execution time of the particular job in DVFS mode scaled by the gradient $\mu$ (written as $E_t/\mu$). The equation for calculating the idle time may be written as $T_{idle}=T_{SLA}-(E_T/\mu+T_{a-dvfsgrad})$.

In some embodiments of the host server system 301, reducing idle time for jobs may result in problems arising in the form of job failures by the VMs 330. This may be the case, because the host system 301 may be assigning jobs via the job scheduler 311 at the last instance in order to reduce the idle time for the jobs. Accordingly, mechanisms may be put in place to repair, recover and predict the occurrence of job failures. The analytics module 317 may perform the task of using machine learning techniques to predict the occurrence of job failures, calculate repair rates, the time needed to execute a particular job and analyze the time sinks caused by a job failure in comparison with the remaining time left to complete the particular job in accordance with the SLA. The analytics module 317 may use machine learning techniques to predict the potential failures and estimated timings without being explicitly programmed. The analytics module 317 may search through instances of past failures, repairs and executions times of particular jobs or other data to look for patterns in the data. The analytics module 317 may be equipped with an inference engine 318 which may draw conclusions about the jobs being performed, the running time of the jobs, failures, failure rates and repair times.

Using previously acquired job data collected by the analytics module 317, the analytics module 317 may calculate the probabilities of experiencing failures generically from known failure rates ($\lambda$), the number of failures per unit time ($\lambda/t$) and the number of failures in a whole execution cycle ($\lambda/T_{ex}$). In alternative embodiments, the analytics module 317 may calculate specific probabilities of hardware, software or catastrophic failures per execution cycle ($\delta$), the number of hardware, software of catastrophic failures per unit of time ($1/\delta$), the number of anticipated failures during an execution cycle, wherein defined by $\delta*Tex$ and maximum number of failures which may be written as $$\frac{Tex}{\lambda}+1.$$

In addition to calculating the failure rates a particular VM may experience performing a queued job, the analytics module 317 may use existing data to apply machine learning techniques to calculate a probability of receiving a failure. Embodiments of the failure function, f(t) may be defined as a time variant function having different kinds of failures for a known distribution. The failure function f(t) may equal $$\frac{pdf}{1-cdf}$$

wherein pdf is a probability distribution function and cdf is a cumulative distribution function.

In some embodiments, the failure function may be considered the sum of three separate factors. The "infant mortality" phase which decreases failure rate over time, the normal phase which may be a constant rate of failure over time and the wear out phase which may be an increasing rate of failure over time. During the normal phase of the failure function, the failure rate may be assumed to be constant, therefore taking the shape of an exponential Weibull hazard function distribution, wherein the probability $Z(t)=\lambda$. During the periods of the infant mortality phase and the wear out phase, the Weibull hazard function for calculating probability of failure, $Z(t)=\alpha\lambda(\lambda t)^{\alpha-1}$. The variable $\alpha$ may be the Weibull shape parameter, and $\lambda$ may be the scale parameter of the hazard functions, both of which are constants specific to a particular component causing the failure.

In some embodiments, the analytics module 317 may assume that rate of failure follows a general Poisson distribution, wherein one failure during an interval of time $\Delta t$ is approximately $Z(t)\Delta t$, the probability of two or more failures during the time period of $\Delta t$ is negligible and each of the failures may be independent of one another. Embodiments of the analytics module 317 may define $m(t)=\int_0^t z(x).dx$, which may define the probability of failures "k" within the time 0 to t as being $$\frac{e^{-m(t)}[m(t)]^k}{k!}.$$

Accordingly, the mean number of expected failures, R[k] may equal $$\sum_{k=0}^{\infty} k * \frac{e^{-m(t)}[m(t)]^k}{k!} = m(t).$$

Thus, for a constant failure rate of $\lambda$, $m(t)=\lambda t$, when substituted into the probability of failures (k), the $$P\{k \text{ failures in time } [0, t]\} = \frac{e^{-m(t)}[\lambda t]^k}{k!}.$$

The rate of failure $R[k]=var[k]=\lambda t$ wherein for the Weibull hazard function z(t) may equal $z(t)=\alpha A(\lambda t)^{\alpha-1}$ and $m(t)=(\lambda t)^\alpha$ therefore, the probability of failures (P) within the time $$[0, t] = \frac{e^{-\lambda t}[\lambda t]^{k\alpha}}{k!}$$

and $R[k]=var[k]=(\lambda t)^\alpha$.

Embodiments of the analytics module 317 may utilize the probability calculations described above to calculate the chances of successfully recovering a job queued with a failed VM using machine learning techniques. Using parameter data collected by the analytics module 317 and data from previous failures, the inference engine 318 of the analytics module 317 may draw conclusions regarding how to recover from job failures. Specifically, the inference engine 318 may determine the appropriate conditions to complete the jobs in active mode or scalable mode and furthermore, when the current conditions may be optimal for transferring the job to a second VM 330 or to repair the current VM and maintain the job with the current VM 330.

Embodiments of the inference engine 318 may draw different conclusions regarding how to treat jobs and recover from failed jobs based on the criticality of the job being performed. For example, critical jobs exceeding the threshold probability of failure may be treated differently than non-critical jobs that exceed a threshold probability for failure. Moreover, in some embodiments, the threshold probability for critical job failure may be lower than the threshold probability for non-critical job failure.

In situations wherein a VM has failed and is unable to complete a job, the inference engine 318 may make a decision how to treat the job based on the known data set of job failures previously analyzed by the analytics module 317 using machine learning. The inference engine 318 may decide the best course of action for the host server system 301 to take in order to complete jobs on time within the specifications of the SLA. For example, in a situation wherein a critical job may have failed to complete, the analytics module 318 may identify that the amount of time remaining to complete the job within the SLA specification may be less than the predicted time it may take to repair the VM, thus exceeding the threshold probability of completing the queued job within the prescribed time. Based on this information, the inference engine 318 may draw the conclusion that retaining the job in the current VM's 330 queue would not be appropriate. Instead, the inference engine 318 may draw the conclusion that transferring the job to a second VM 330 would allow for the highest probability of successfully completing the job within the specifications of the SLA.

Using the example above, in addition to transferring the job from the failed VM's queue to a second VM, the analytics module 317 and inference engine 318 may further determine the best mode for operation of the second VM to complete the newly assigned job. The analytics module 317 may, in some embodiments, evaluate time it may take to transition the job from the failed VM to the new VM and the time it will take to complete the execution of the job. If, the transition time and the execution time are greater than or equal to the remaining time as defined by the SLA to complete the job, the inference engine 318 may reach the conclusion that the VM receiving the job should be operating in DVFS mode at a gradient sufficient to complete the job on time. Likewise, if the transition time and the execution time for the job are less than the amount of time remaining to complete the queued job, the new VM receiving the job for completion may be a VM operating in a non-scalable, active mode. Once the failed VM 330 has been repaired, the repaired VM may continue to process the jobs placed in queue.

In a different example, the analytics module 317 and inference engine 318 may be presented with different parameters for recovering from failed VM. For instance, under a circumstance wherein the remaining time to complete a queue job is greater than or equal to the time for repairing the failed VM, the analytics module 317 and inference engine 318 may calculate the probabilities of completing the job on the failed VM after repairs have completed or determine that the job should be transferred to a second VM for completion. Under certain conditions, the analytics module 317 may determine that the time to repair the VM and execute the job to completion may be greater than or equal to the amount of time allotted for completing the job by the SLA. Accordingly, waiting for the VM to be repaired and then execute the job may lead to defaulting on the quality of service outlined in the SLA. To avoid a default on the SLA requirements under this scenario, the job may be assigned to a VM operating in DVFS mode or active mode. The selected mode may be dependent on the amount of time needed to transfer the job and execute the job on the new VM. If the transition time plus execution time is greater than or equal to the time remaining to complete the queued job, the new VM receiving the job may be an active mode VM. Conversely, if the transition time plus execution time is less than the remaining time to complete the queued job, the job scheduler 311 may assign the job to a VM operating in DVFS mode at an optimal gradient.

On some occasions, the analytics module 317 and inference engine 318 may draw the conclusion that repairing the failed VM 330 and continuing to run the job on the repaired VM 330 is the optimal decision for completing the job. For instance, in a situation wherein the repair time plus the execution time to complete the job are less than time remaining to complete the job within the SLA specifications, the host server system 301 may wait for the VM to be repaired. In some embodiments wherein repairs have been concluded as the best option, the analytics module 317 and inference engine 318 may continuously monitor the repair efforts. After each repair effort, the analytics module 317 and inference engine 318 may compare the expected repair time or transfer time, plus the execution time of the job to ensure that the queued job may still be completed by the VM being repaired. If the repair is successful and the amount of VM is able to execute the job within the SLA's specified timeframe, the VM may be tasked with completing the job. Otherwise, if during the repair operations of the VM the recovery efforts have not successfully concluded yet, and/or during the recovery efforts the analytics module 317 or inference engine 318 identifies there is not enough time to complete the queued job within the specification of the SLA, the queued job may be assigned to second VM operating in DVFS mode operating at a sufficient gradient to complete the job on time.

Referring back to the VM consolidation module 196 of FIG. 3, in some embodiments the system 301 may be equipped with a repair module 321. The repair module 321 may be tasked with repairing each of the VMs 330 suffering from a failure. The repair module 321 may report the failure to the analytics module 317 and/or store the instance of the failure in the memory device 315 or data storage device 320. Moreover, the repair module 321 may track the time taken to repair each VM 330, the time elapsed for each VM repair attempt and the number of repair attempts before achieving a successful repair. The repair information for each VM repair performed by the repair module 321 may be tracked by the host server system 301 and more particularly the analytics module 317 in order to better anticipate repairing times and predict probabilities of a successful repair through machine learning.

Embodiments of the VM consolidation module 196 may further comprise a reporting module 323. The reporting module 323 may be responsible for reporting and displaying output from the host server system 301 in a readable format that a user or administrator of the system 100, 301 may understand. The reporting module may display information relating to the completion of queued jobs, job failures, VM repairs or the status of VM repairs, operating efficiency of the host server system 301 and/or the cloud computing environment 150, the utilization of a physical server's resources by the virtual network 327, energy consumption by each host server system 301 and the statistics of the host system 301 meeting SLA requirements. In some embodiments, the reporting module 323 may construct a report describing the conclusions of the analytics module 317 and inference engine 318.

Method for Reassigning Failed Jobs in a Virtual Network

Figure 4:
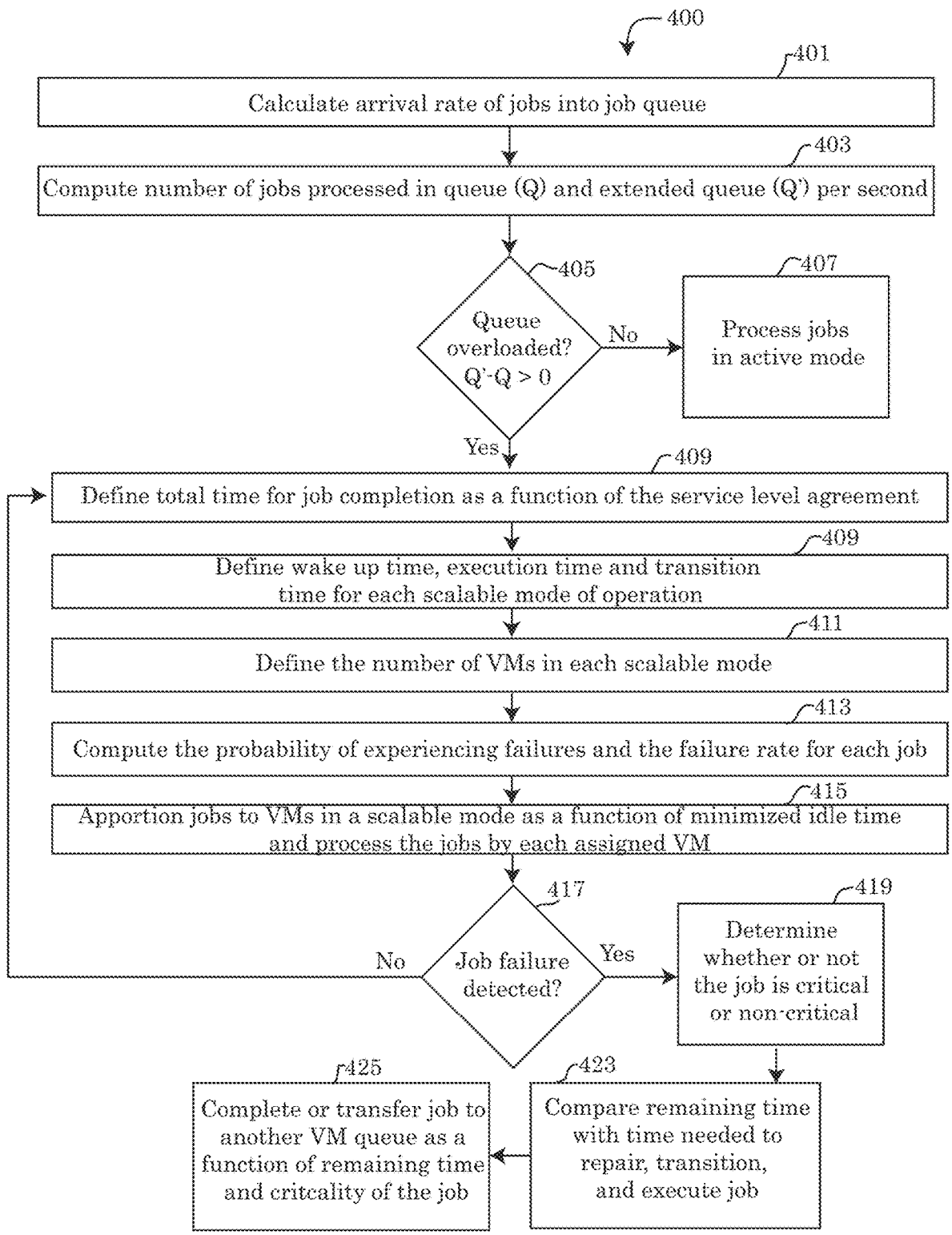
FIG. 4 depicts an embodiment of an algorithm for reassigning failed jobs in a virtual network of virtual machines.

The drawing of FIG. 4 represents an embodiment 400, an algorithm that may be implemented for reassigning failed jobs or jobs having a probability of failing which may occur in a virtual network 327 of virtual machines 330 being maintained by a host server 301 of a network computing environment 150, in accordance with the systems described in FIGS. 1-3 using one or more computer systems defined generically in FIG. 5 below. More specifically by the specific embodiments depicted in FIGS. 1-3. A person skilled in the art should recognize that the steps of the method described in FIG. 4 may not require all of the steps disclosed herein to be performed, nor does the algorithm of FIG. 4 necessarily require that all the steps be performed in the particular order presented. Variations of the method steps presented in FIG. 4 may be performed in a different order than presented by FIG. 4.

The algorithm 400 described in FIG. 4 may describe an embodiment for reassigning failed jobs or jobs having a probability of failing, in a virtual network 327 of virtual machines 330. The algorithm 400 may initiate in step 401 by calculating the arrival rate of jobs into the job queue 401. This step may be performed by the job queue module 307 which may receive each of the jobs being transmitted to a host server system 301 that may be connected to the cloud computing environment 150. The host server 301 may be one or more nodes 110 in the cloud computing network 150. The jobs being received by the job queue module 307 may be sent by one or more customers operating a client computing device 101 connected to the cloud computing environment 150, as shown in FIG. 1. As each of the jobs received by the host computer system 301 arrive, the job queue module 307 may place the jobs into a centralized job queue of host server system 301 or the job queue assigned to each VM 330 of the host server system's 301 virtual network 327. Once the amount of jobs arriving has exceeded the job queue maintained by the job queue module 307, the jobs may be placed into an extended job queue managed by the extended job queue module 309

In step 403 of the algorithm 400, the physical server 303 of the host server system 301 may compute the number of jobs processed in the job queue (Q) and the extended job queue (Q') per second. In step 405, the host server system 301 may make a calculation of whether or not the job queue has been overloaded. In order to calculate whether or not the job queue is overloaded, the host server system 301 may calculate whether the number of jobs in the extended queue, minus the number of jobs in the job queue, is greater than zero. This may be written as $Q'-Q>0$. If the host server system 301 is not experiencing an overloaded queue, the algorithm may proceed to step 407, wherein each of the jobs queued by the host server system 301 are assigned by the job scheduler 311 to VMs 330 operating in active mode.

Conversely, in step 405, the host server system 301 may determine that the jobs queue is overloaded as a function of the number of jobs calculated in step 403 and compared in step 405. Under such conditions, wherein the number of jobs in the extended job queue exceeds the number of jobs in the job queue, the algorithm 400 may proceed to step 409. In step 409, the job scheduler 311 of the host server system 301 may define the total time for completing each individual job processed by the job queue module 307 and the extended job queue module 309. The amount of time to complete each job may be calculated as a function of the SLA contractually defining the quality of service that should be provided to the customers of the cloud computing environment 150.

In step 409 of the algorithm 400, the job scheduler 311 in coordination with the analytics module 317 may define the expected wake up times for each VM, execution times for completing the jobs, transition times and transferring times for transmitting the jobs to the VM 330, each operating in a scalable operating mode. The times may be calculated by the analytics module 317 using machine learning based on operating statistics of jobs previously performed by the host server system 301. Moreover, in step 411, job scheduler 311 and the mode selector 314 may further define each of the VMs operating in a scalable mode (i.e. DVFS mode and the gradient, p).

In step 413, the analytics module 317 compute the probability of experiencing one or more job failures as well as the failure rate for each job currently in queue with the host server system 301. The inference engine 318 of the analytics module may, based on the machine learning data sets of the analytics module, draw conclusions about the most efficient manner for apportioning the jobs to each of the VMs of the host server system 301 along with a prediction of the distribution of jobs to the VMs 330 that will result in the most acceptable amount of failures based on the calculated failure rate expected by the analytics module 317.

In step 415, the job scheduler module 311 may apportion each of the jobs in the job queue and/or extended job queue to a VM 330 of the virtual network 327 operating in a scalable mode or active mode, as a function of the probability calculation of step 413. The determination of which VMs to apportion each of the jobs to may be determined as a function minimizing the idle time of each VM 330, the energy consumption of host server system 301, while balancing the efficiency of the host server system 301 to complete each assigned job within the parameters set by the SLA while minimizing the probability of experiencing a failure as described in step 413. Once the job is assigned to the VMs 330, each VM may process the assigned jobs in a scalable mode or active mode of operation set by the mode selector 314.

As the jobs are being processed by the VMs in step 415, there is a possibility that one or more VMs may experience a job failure in step 417. If, in step 417, a job failure is not detected, the VMs may complete the assigned job and may wait for the next job to be assigned, start completing the next job in the VMs queue or reduce power consumption by returning to a lower power state such as a sleep mode, inactive mode or powernap mode. The algorithm 400 may return from step 417 back to step 409 and continue processing jobs as described above.

Likewise, in step 417, a job failure may be detected by the host server system 301. Upon detecting a job failure in step 417, the algorithm 400 may proceed to step 419. In step 419, the analytics module 317 may retrieve the details of the surrounding the failure of the VM 330 and the job type that may have failed. In particular, in step 419 the analytics module 317 may receive data identifying the type of job failure (i.e. hardware, software, catastrophic) and whether not the job may have been a critical job or non-critical job. Moreover, once the job failure has been identified and details are obtained by the analytics module 317, the analytics module may, in step 423 further compare the remaining time with the timing parameters of the SLA for completing the job as well as the amount of predicted time needed to repair, transition or execute the job to completion. As a function of the details of the job failure identified in step 419, and the timing calculations made in step 423, the inference engine 318 may ultimately determine the proper course for completing the failed job. The inference engine 318 may determine to repair the failed VM and complete the job using the repaired VM; transfer the job to a new scalable VM or transfer the job to new active VM.

Figure 5:
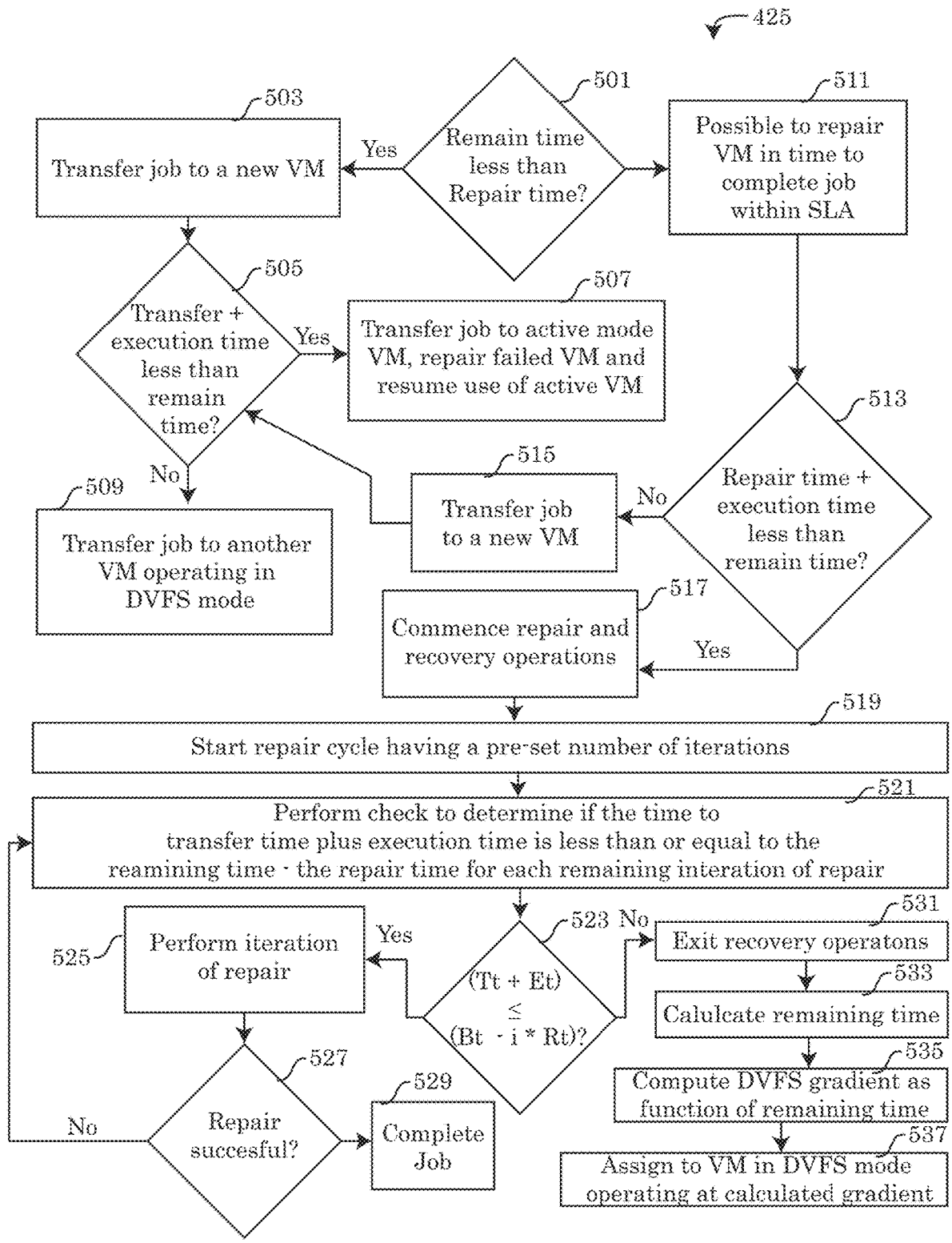
FIG. 5 depicts an embodiment of an algorithm for reassigning failed jobs on a failed active node.
Figure 6:
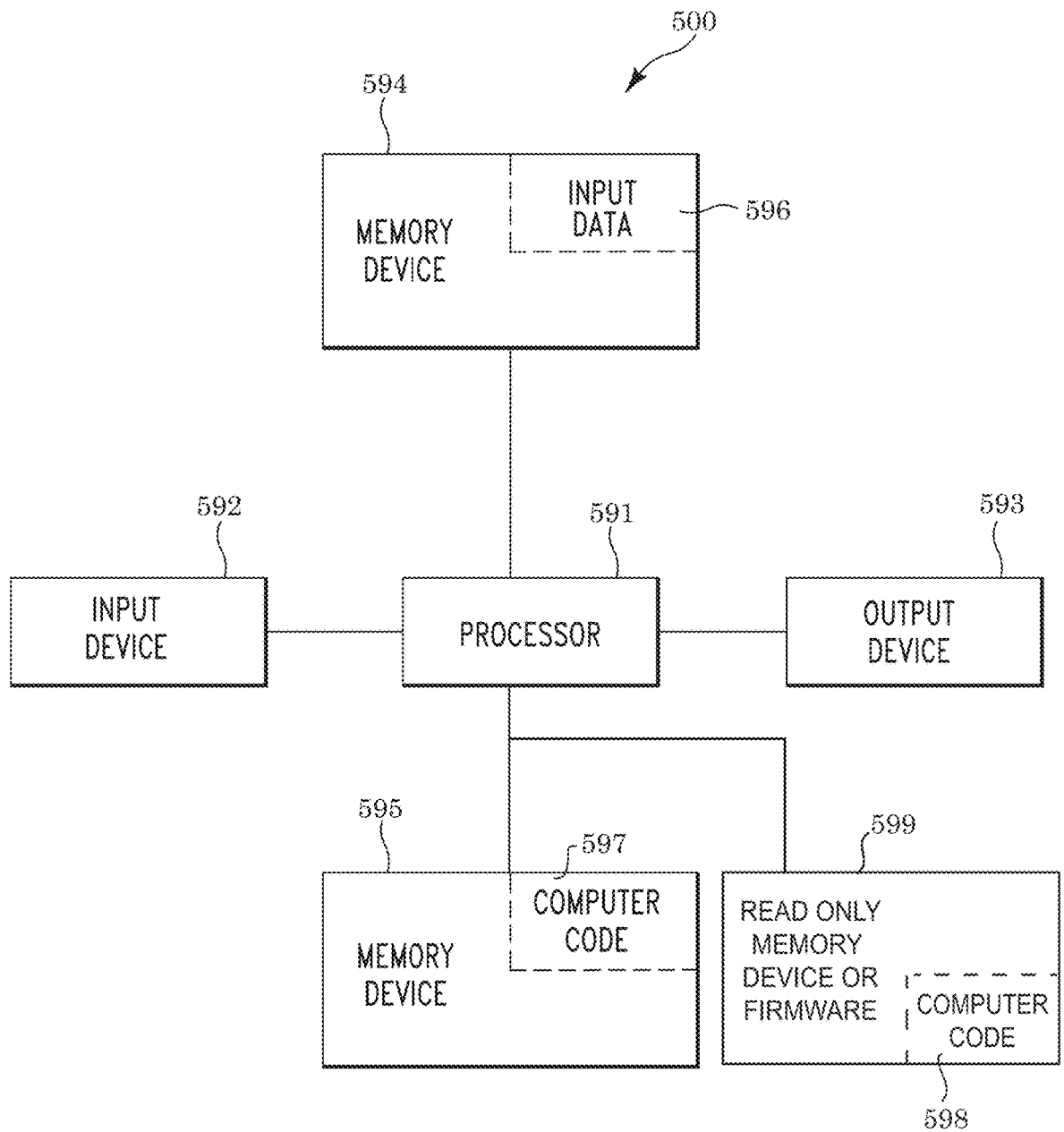
FIG. 6 depicts a block diagram of a computer system able to implement the methods for reassigning failed jobs in a virtual network of virtual machines, consistent with the disclosure of the present application.

The algorithm of FIG. 5, depicts the steps that may be taken by the host server system 301 in step 425 of the algorithm 400 when the inference engine 318 is deciding whether to transfer the job from the current VM 330 to a new VM for the purposes of completing the job or repair the failed VM and complete the job as originally scheduled by the job scheduler 311. As shown in the drawing of FIG. 5, the decision of the inference engine 318 may begin at step 501. The inference engine 318 may calculate and compare the remaining time for completing the failed job within the parameters of the SLA and the time it may take to repair the failed VM 330. If, the remaining time (also referred to as buffer time, $B_t$), is less than the time it may take to repair the VM 330, the inference engine 318 may proceed to step 503, wherein the decision may be made to transfer the job to a new VM. This may be the logical conclusion because it may not be possible to repair the VM (let alone run the job) within the remaining allotted time. Thus, a conclusion may be made to utilize a VM 330 in the virtual network 327 operating within an operating mode that may complete the job within the allotted buffer time.

The inference engine 318 may continue to use machine learning to identify the operating mode the VM 330 receiving the transferred job may operate in. The inference engine 318 may, in step 505 calculate the amount of time that it may take to transfer the job to the new VM plus the time for executing the job on the new VM. If the calculated time in step 505 is less than the remaining amount of buffer time defined by the SLA, the algorithm may proceed to step 507, whereby the job scheduler 311 may transfer the job from the failed VM to a new VM operating in a non-scalable active mode. If, on the other hand the time needed to transfer the job plus time estimated for executing the job are greater than the amount of time remaining as defined by the SLA, the job may be transferred to a new VM 330 operating in a scalable DVFS mode, which may be operating at a gradient p configured to have an increased capacity and processing power for completing the job at a rate faster than an active mode VM. Thus completing the job using the new VM within the timing defined by the SLA.

If, on the other hand, in step 501, the remaining time to complete the job is greater than or equal to the repair time, the inference engine 318 may determine in step 511 that there may be a sufficient probability that the job may be completed within the defined timing of the SLA by repairing the current VM 330 and proceeding with the job as originally scheduled. The inference engine 318 may proceed to step 513, wherein the inference engine 318 may calculate an estimated repair time based on previous repairs using machine learning, plus the time to execute the job to completion. The inference engine 318 may compare the timing to complete the repair plus execution time and if the repair plus execution time is not less than the remaining time as defined by the SLA, the algorithm may proceed to step 515, wherein the job scheduler may transfer the job to a new VM in accordance with the calculations and rules described above in step 505. Conversely, if the repair time to fix the VM 330 plus execution time for running the job on the VM 330 is less than the remaining time allotted by the SLA, the algorithm may proceed to step 517 and commence repair and recovery operations.

In step 519, the repair cycle may commence. The repair cycle may comprise a pre-determined or programmed number of iterations (n), wherein every $i^{th}$ iteration is a repair effort or attempt to repair the failed VM 330. While the current iteration is less than the total number of iterations (i≤n) during the repair cycle, the inference engine 318 may perform a check in step 521 to determine if the estimated time to transfer the job to a new VM plus the time needed to execute the job on the new VM is less than or equal to the amount of remaining time prescribed by the SLA minus the number of iterations of repair that are left to attempt. The purpose of performing the check may be to determine whether or not there is ample time to continue to perform repair efforts and still be able to run the job once the repair has completed. Moreover, the inference engine 318 continues to compare the repair/execution time with the transfer/execution time to ensure that if the repairs fail at this point, there is still time to have a new VM complete the job on time.

In step 523, the comparison between the transfer time ($T_t$) plus the execution time ($E_t$) to complete the jobs is calculated and compared with the remaining buffer time ($B_t$) minus the $i^{th}$ iteration of repair times the repair time for each iteration. If, the transfer time plus execution time is less than the buffer time—$i^{th}$ iteration*repair time, inference engine 318 may continue with the repair by proceeding to step 525 of the algorithm, perform the current iteration of the repair. Moreover, the host server system 301 may perform a check on the VM 330 being repaired after the current iteration of the repair has been performed in step 527. If the repair performed in step 525 is successful, the algorithm may proceed to step 529 and process the job to completion using the repaired VM. Otherwise, if the repair was not successful in step 525, the host server system 301 may have the inference engine 318 return to step 521 to determine if there is enough buffer time remaining to perform another repair attempt.

If on the other hand in step 523 it is determined that transfer time plus execution time is not less than buffer time minus the $i^{th}$ iteration*repair time, the inference engine 318 may draw the conclusion that there may not be enough time to repair and execute the current job on the failed VM 330. The algorithm may proceed to step 531 wherein the host server system 301 exits recovery operations and proceeds calculate the remaining buffer time in step 533 available to complete the current job. In step 535, the remaining time calculated in step 533 may be used to determine the gradient (μ) of the scalable VM 330 that may be used to complete the job on time. The gradient μ may be calculated as a function of the buffer time wherein $$\mu = \frac{\text{job execution time } (Es)}{\text{buffer time } (Bt) - \text{time lapsed performing unsuccessful recovery operations}}.$$

Once the gradient has been calculated, the job scheduler 311 may assign the job, in step 537 from the failed VM to the new VM operating in scalable DVFS mode operating at the calculated gradient.

EXAMPLE

The following example describes the type of failures that may be experienced and mitigated by the system 301 of the current disclosure, taking into account the running time in an VM running in active mode, available SLA time, buffer time, the probability of failure detection, the maximum number of failures that may occur under the SLA in the worst case scenario, the failure rate within a unit of time as well as effects of the threshold value of the probability of failure for critical and non-critical jobs, wherein critical jobs have a lower threshold value for predicting a failure may occur:

Suppose a job has an SLA of 40 sec and a running time of 12 sec. The time left to execute the job may be calculated to be 40 s−12 s=28 s. The job may be prone to different types of failures, each having a different time frequency. The errors may be "Error X", "Error Y" and "Error Z". In this example, Error X may have a probability that in every 4 sec, an error may occur, resulting in a probability of an error per second being $\frac{1}{4}$. Error Y may have a probability that in every 6 sec, an error may occur ($\frac{1}{6}$ probability) and Error Z may have a probability of an error occurring in every 8 sec ($\frac{1}{8}$ probabilty).

Under this example, we may also suppose that there may be three types of jobs, each having different criticality with the transition that may take place:

| S. No. | Criticality of jobs | No. of jobs in Queue | Transition from PowerNap to Inactive mode | Transition from PowerNap to Active mode | Transition from PowerNap To $DVFS_{gradient}$ | Transition from PowerNap To $DVFS_{max}$ |
|---|---|---|---|---|---|---|
| 1 | $L_{low}$ | N | Yes | No | No | No |
| 1 | $L_{high}$ | N | No | Yes | No | No |
| 2 | $M_{low}$ | >N | No | No | No | No |
| 2 | $M_{high}$ | >N | No | No | Yes | No |
| 3 | High (H) | >>N | No | No | No | Yes |

As shown in the table above, are the transitions in this example in the case of processing the jobs normally with a queue length Q. After calculating the probability of failure, the system may calculate the maximum number of failures that can happen with the SLA. With the running time of 12 sec, the number of failures that may occur in an active mode VM may be 4 for Error X, 3 for Error Y and 2 for Error Z.

Next, a threshold value for the different critical jobs may be calculated similar to the current probability of a failed job occurring and being placed into the same queue:

| Job Type | Failure Probability |
|---|---|
| $L_{low}$ | $\frac{1}{2}$ |
| $L_{high}$ | $\frac{1}{4}$ |
| $M_{low}$ | $\frac{1}{6}$ |
| $M_{high}$ | $\frac{1}{8}$ |
| $H_{high}$ | $\frac{1}{12}$ |

Suppose there is an Error X type failure with an L criticality. In previous experiences based on machine learning, this job may have been transferred to a new queue 26 out of 50 times due to the threshold of $\frac{1}{2}$. When the error occurs again, the job will also be assigned to a new queue of a second VM. However, if the ratio was reversed, wherein the job was not transferred to a new VM queue 26 out of 50 times, with a threshold of $\frac{1}{2}$, the job would be performed by the VM of the current queue. If, the job failed in the current queue of the VM, making the ratio $\frac{26}{51}$, the next time the same situation came along, under the machine learning techniques, the system would assign the job to a new VM queue because $\frac{26}{51}$ is nearly $\frac{1}{2}$.

Computer System

Referring to the drawings, FIG. 5 illustrates a block diagram of a computer system 500 that may be included in the systems of FIGS. 1-3 and for implementing algorithms for reassigning failed jobs in a virtual network of virtual machines described in FIG. 4 and in accordance with the embodiments described in the present disclosure. The computer system 500 may generally comprise a processor 591, otherwise referred to as a central processing unit (CPU), an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for tools and programs for reassigning failed jobs in a virtual network of virtual machines, in the manner prescribed by the embodiments of the disclosure using the systems of FIGS. 1-3, wherein the instructions of the computer code 597 may be executed by processor 591 via memory device 595. The computer code 597 may include software or program instructions that may implement one or more algorithms for reassigning failed jobs in a virtual network of virtual machines, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597, 598. The output device 593 displays output from the computer code 597, 598. Either or both memory devices 594 and 595 may be used as a computer usable storage medium (or program storage device) having a computer readable program embodied therein and/or having other data stored therein, wherein the computer readable program comprises the computer code 597, 598. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597, 598) in order to reduce the number of times code must be retrieved from bulk storage while instructions of the computer code 597, 598 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in the figures.

In some embodiments, rather than being stored and accessed from a hard drive, optical disc or other writeable, rewriteable, or removable hardware memory device 594, 595, stored computer program code 598 (e.g., including algorithms) may be stored on a static, non-removable, read-only storage medium such as a Read-Only Memory (ROM) device 599, or may be accessed by processor 591 directly from such a static, non-removable, read-only medium 599. Similarly, in some embodiments, stored computer program code 597 may be stored as computer-readable firmware 599, or may be accessed by processor 591 directly from such firmware 599, rather than from a more dynamic or removable hardware data-storage device 595, such as a hard drive or optical disc.

In some embodiments, the computer system 500 may further be coupled to an input/output (I/O) interface and a computer data storage unit (for example a data store, data mart or repository). An I/O interface may include any system for exchanging information to or from an input device 592 or output device 593. The input device 592 may be, inter alia, a keyboard, joystick, trackball, touchpad, mouse, sensors, beacons, RFID tags, microphones, biometric input device, camera, timer, etc. The output device 593 may be, inter alia, a printer, a plotter, a display device (such as a computer screen or monitor), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

The I/O interface may allow computer system 500 to store information (e.g., data or program instructions such as program code 597, 598) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect identifying errors in a multi-threaded application. Thus, an embodiment of the present invention discloses a process for supporting computer infrastructure, where the process includes providing at least one support service for at least one of integrating, hosting, maintaining and deploying computer-readable code (e.g., program code 597, 598) in a computer system (e.g., computer 500) including one or more processor(s) 591, wherein the processor(s) carry out instructions contained in the computer code 597 causing the computer system to reassign failed jobs in a virtual network of virtual machines Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for reassigning failed jobs in a virtual network of virtual machines. Thus the present invention discloses a process for supporting, deploying and/or integrating computer infrastructure, integrating, hosting, maintaining, and deploying computer-readable code into the computer system 500, wherein the code in combination with the computer system 500 is capable of performing a method of reassigning failed jobs in a virtual network of virtual machines.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for reassigning failed jobs in a virtual network of virtual machines, said method comprising:

determining, by a processor, that a job queue of the virtual network is overloaded as a function of a length of an extended job queue being greater than a length of the job queue;

setting, by the processor, each job in the job queue to be processed in a scalable mode of operation as a function of the job queue being overloaded;

apportioning, by the processor, a job in the job queue to a virtual machine in the virtual network operating in the scalable mode of operation;

failing, by the processor, to complete the job queued by the virtual machine;

computing, by the processor, a probability of failing to complete the job by the virtual machine; and determining, by the processor, as a function of the probability of failing to complete the job, whether to complete the job queued by the virtual machine or transfer the job to a queue of a second virtual machine operating in a dynamic voltage and frequency scaling (DVFS) mode or an active mode.

2. The method of claim 1, wherein said computing comprises computing the probability of failing to complete the job by the virtual machine as a function of an amount of time to execute the job to completion, a repair time, a failure rate, and an amount of time remaining to complete the job within a time designated by a service level agreement.

3. The method of claim 2, wherein said computing comprises computing that the repair time and the amount of time to execute the job to completion on the virtual machine is greater than the amount of time remaining to complete the job, wherein a transition time to the second virtual machine plus the amount of time to execute the job on the second virtual machine is greater than the amount of time remaining to complete the job, and wherein the job is assigned to the second virtual machine operating in active mode.

4. The method of claim 1, said method further comprising:
transferring, by the processor, the job queued by the virtual machine to the job queue of the second virtual machine operating in DVFS mode having a selected gradient factor of µ.

5. The method of claim 4, said method further comprising:
simultaneously repairing, by the processor, the virtual machine while the second virtual machine completes the job.

6. The method of claim 1, said method further comprising:
repairing, by the processor, the virtual machine failing to complete the job; and
completing, by the processor, the job using the virtual machine after being repaired.

7. The method of claim 1, wherein the scalable mode of operation is selected from the group consisting of power nap to active mode, inactive to power nap to active mode, and active mode to DVFS mode.

8. The method of claim 1, said method further comprising:
automatically transferring, by the processor from the job queue of the virtual machine to the second virtual machine, a critical job having the amount of time remaining to complete the job within a time designated by a service level agreement that is less than the repair time.

9. A computer system, comprising: a processor; a memory device coupled to the processor; and a computer readable storage device coupled to the processor, wherein the storage device contains program code executable by the processor via the memory device to implement a method for reassigning failed jobs in a virtual network of virtual machines, said method comprising:
determining, by the processor, that a job queue of the virtual network is overloaded as a function of a length of an extended job queue being greater than a length of the job queue;
setting, by the processor, each job in the job queue to be processed in a scalable mode of operation as a function of the job queue being overloaded;
apportioning, by the processor, a job in the job queue to a virtual machine in the virtual network operating in the scalable mode of operation;
failing, by the processor, to complete the job queued by the virtual machine;
computing, by the processor, a probability of failing to complete the job by the virtual machine; and
determining, by the processor, as a function of the probability of failing to complete the job, whether to complete the job queued by the virtual machine or transfer the job to a queue of a second virtual machine operating in a dynamic voltage and frequency scaling (DVFS) mode or an active mode.

10. The computer system of claim 9, wherein said computing comprises computing the probability of failing to complete the job by the virtual machine as a function of an amount of time to execute the job to completion, a repair time, a failure rate, and an amount of time remaining to complete the job within a time designated by a service level agreement.

11. The computer system of claim 10, wherein said computing comprises computing that the repair time and the amount of time to execute the job to completion on the virtual machine is greater than the amount of time remaining to complete the job, wherein a transition time to the second virtual machine plus the amount of time to execute the job on the second virtual machine is greater than the amount of time remaining to complete the job, and wherein the job is assigned to the second virtual machine operating in active mode.

12. The computer system of claim 1, said method further comprising:
transferring, by the processor, the job queued by the virtual machine to the job queue of the second virtual machine operating in DVFS mode having a selected gradient factor of µ.

13. The computer system of claim 12, said method further comprising:
simultaneously repairing, by the processor, the virtual machine while the second virtual machine completes the job.

14. The computer system of claim 9, said method further comprising:
repairing, by the processor, the virtual machine failing to complete the job; and
completing, by the processor, the job using the virtual machine after being repaired.

15. A computer program product comprising: one or more computer readable hardware storage devices having computer readable program code stored therein, said program code containing instructions executable by one or more processors to implement a method for reassigning failed jobs in a virtual network of virtual machines, said method comprising:
determining, by the processor, that a job queue of the virtual network is overloaded as a function of a length of an extended job queue being greater than a length of the job queue;
setting, by the processor, each job in the job queue to be processed in a scalable mode of operation as a function of the job queue being overloaded;
apportioning, by the processor, a job in the job queue to a virtual machine in the virtual network operating in the scalable mode of operation;
failing, by the processor, to complete the job queued by the virtual machine;
computing, by the processor, a probability of failing to complete the job by the virtual machine; and
determining, by the processor, as a function of the probability of failing to complete the job, whether to complete the job queued by the virtual machine or transfer the job to a queue of a second virtual machine operating in a dynamic voltage and frequency scaling (DVFS) mode or an active mode.

16. The computer program product of claim 15, wherein said computing comprises computing the probability of failing to complete the job by the virtual machine as a function of an amount of time to execute the job to completion, a repair time, a failure rate, and an amount of time remaining to complete the job within a time designated by a service level agreement.

17. The computer program product of claim 16, wherein said computing comprises computing that the repair time and the amount of time to execute the job to completion on the virtual machine is greater than the amount of time remaining to complete the job, wherein a transition time to the second virtual machine plus the amount of time to execute the job on the second virtual machine is greater than the amount of time remaining to complete the job, and wherein the job is assigned to the second virtual machine operating in active mode.

18. The computer program product of claim 15, said method further comprising:
- transferring, by the processor, the job queued by the virtual machine to the job queue of the second virtual machine operating in DVFS mode having a selected gradient factor of $\mu$.

19. The computer program product of claim 18, said method further comprising:
- simultaneously repairing, by the processor, the virtual machine while the second virtual machine completes the job.

20. The computer program product of claim 15, said method further comprising:
- repairing, by the processor, the virtual machine failing to complete the job; and
- completing, by the processor, the job using the virtual machine after being repaired.

* * * * *